(12) United States Patent
Sarkar et al.

(10) Patent No.: US 10,929,182 B2
(45) Date of Patent: Feb. 23, 2021

(54) SYSTEMS AND METHODS FOR SCHEDULING A SET OF NON-PREEMPTIVE TASKS IN A MULTI-ROBOT ENVIRONMENT

(71) Applicant: Tata Consultancy Services Limited, Mumbai (IN)

(72) Inventors: Chayan Sarkar, Kolkata (IN); Marichi Agarwal, Kolkata (IN)

(73) Assignee: Tata Consultancy Services Limited, Mumbai (IN)

(*) Notice: Subject to any disclaimer, the term of this patent is extended or adjusted under 35 U.S.C. 154(b) by 61 days.

(21) Appl. No.: 16/284,991

(22) Filed: Feb. 25, 2019

(65) Prior Publication Data

US 2020/0004588 A1 Jan. 2, 2020

(30) Foreign Application Priority Data

Jun. 29, 2018 (IN) .............................. 201821024387

(51) Int. Cl.
*G06F 9/48* (2006.01)
*B25J 9/16* (2006.01)

(52) U.S. Cl.
CPC .......... *G06F 9/4887* (2013.01); *B25J 9/1661* (2013.01)

(58) Field of Classification Search
None
See application file for complete search history.

(56) References Cited

U.S. PATENT DOCUMENTS

| 6,418,356 | B1 * | 7/2002 | Oh ........................ G06Q 10/06 700/217 |
| 7,539,557 | B2 * | 5/2009 | Yamauchi ............ G05D 1/0038 340/12.54 |
| 8,095,238 | B2 * | 1/2012 | Jones ....................... B25J 5/007 180/168 |
| 8,285,417 | B2 * | 10/2012 | Kawaguchi ............ B25J 9/1661 700/245 |
| 9,821,455 | B1 * | 11/2017 | Bareddy ................ B25J 9/0084 |
| 10,456,912 | B2 * | 10/2019 | Baroudi ................. B25J 9/1602 |
| 10,500,718 | B2 * | 12/2019 | Kuffner, Jr. ........ G05B 19/4187 |

(Continued)

FOREIGN PATENT DOCUMENTS

KR 100812986 2/2008

OTHER PUBLICATIONS

Al-Aubidy et al. "Multi-Robot Task Scheduling and Routing Using Neuro-Fuzzy Control", 2015 IEEE, 6 pages.*

(Continued)

*Primary Examiner* — Van H Nguyen
(74) *Attorney, Agent, or Firm* — Finnegan, Henderson, Farabow, Garrett & Dunner, LLP

(57) ABSTRACT

System and method is provided for scheduling of a set of non-preemptive tasks by partitioning, the set of non-preemptive tasks either as a set of schedulable tasks or as a set of non-schedulable tasks; sorting, by a scheduling technique, the set of non-preemptive tasks partitioned; determining, by the scheduling technique, a possibility of execution of each of the set of schedulable tasks; and scheduling the set of schedulable tasks and the set of non-schedulable tasks upon determining the possibility of execution of each of the set of schedulable tasks.

18 Claims, 9 Drawing Sheets

(56) References Cited

U.S. PATENT DOCUMENTS

2009/0158299 A1    6/2009  Carter
2014/0351819 A1   11/2014  Shah et al.

OTHER PUBLICATIONS

Lee et al. "User-centric Real Time Service Scheduling for Robots", 2011 IEEE, pp. 1024-1028.*

Shah et al. "Communication-Efficient Dynamic Task Scheduling for Heterogeneous Multi-Robot Systems", 2007 IEEE, pp. 230-235.*

Gombolay, M. et al. (Jun. 2013). "Fast Scheduling of Multi-Robot Teams with Temporospatial Constraints," *Robotics: Science and Systems IX*; 8 pages.

Zhang, Y. et al. "Multi-Robot Task Scheduling," *Proceedings of IEEE International Conference on Robotics and Automation*, Karlsruhe, Germany, May 6-10, 2013; 7 pages.

* cited by examiner

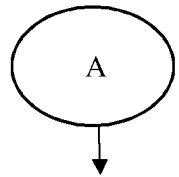

Scheduling, in a pre-defined order, the plurality of tasks partitioned by performing a plurality of steps, wherein the plurality of steps comprise: (i) sorting, by the scheduling technique, the plurality of tasks partitioned in non-increasing order of one or more performance loss values corresponding to the plurality of tasks partitioned; (ii) scheduling the set of schedulable tasks in the multi-robot environment by assigning at least one of the set of schedulable tasks to each robot amongst a plurality of robots operating in the multi-robotic environment by implementing a compaction mechanism, wherein the scheduling comprises: (a) determining, by the scheduling technique, a possibility of execution of each of the set of schedulable tasks in the multi-robot environment; (b) determining, by the scheduling technique, a possibility of scheduling a set of pre-assigned tasks amongst the plurality of robots, wherein the set of pre-assigned tasks comprise one or more tasks other than the set of schedulable tasks and the set of non-schedulable tasks; and (c) scheduling, by the compaction mechanism, the set of schedulable tasks in the multi-robotic environment upon determining the possibility of execution of each of the set of schedulable tasks and the possibility of scheduling the set of pre-assigned tasks; and (iii) scheduling, by a list-scheduling technique, the set of non-schedulable tasks amongst the plurality of robots.

SYSTEMS AND METHODS FOR SCHEDULING A SET OF NON-PREEMPTIVE TASKS IN A MULTI-ROBOT ENVIRONMENT

PRIORITY CLAIM

This U.S. patent application claims priority under 35 U.S.C. § 119 to: India Application No. 201821024387, filed on Jun. 29, 2018. The entire contents of the aforementioned application are incorporated herein by reference.

TECHNICAL FIELD

This disclosure relates generally relates to scheduling a set of non-preemptive tasks in a multi-robot environment, and, more particularly, to systems and methods for scheduling a set of non-preemptive tasks in a multi-robot environment.

BACKGROUND

Multi-robot systems and related technologies are being used widely in digital and automation era in a variety of applications and industries. For example, for a warehouse procurement system, the multi-robot systems are deployed to automate the process of storing and retrieving a wide variety of objects in and out of a warehouse. In a warehouse, good are systematically stored across a large area and are taken out of storage based upon the demand. Movement of goods or objects in and out of the warehouse poses a major challenge in terms of scheduling of tasks (relating to the movement to goods). Copious amount of demands flowing into the warehouse procurement system in real-time necessitates a demand for an optimum scheduling. With a rapid development of e-commerce and modern logistics, warehousing systems have a tremendous scale of inventory and a wide range of high demand vis-a-vis short-picking time, thereby demanding deployment of robotic systems.

Task allocation in multi-robot systems is thus gaining a significant importance due to application in industrial and other technological domains. The process of assigning individual robots to sub-tasks of a given system-level task is called task allocation, and comprises a key functionality required of any multi-robot system. The purpose of task allocation is to assign robots task(s) in a way that will enhance the performance of the multi-robot system, which comprises reducing overall execution time. Generally, task allocation is an essential requirement for multi-robot systems functioning in unknown dynamic environments. It allows robots to change their behavior in response to environmental changes or actions of other robots in order to improve overall system performance.

Task allocation in the multi-robot systems thus poses a complex challenge, especially in such robotics environments, wherein robots are equipped with different capabilities that are required to perform various tasks with different requirements and constraints in an optimal way. Because the problem of task allocation is a dynamic decision problem that varies in time with phenomena including environmental changes, the problem must be solved iteratively a specified time interval. Thus, the problem of task allocation becomes more complex to tackle. The requirements of a particular technological domain under consideration further affect the features and complexity of multi-robot task allocation problems.

SUMMARY

Embodiments of the present disclosure present technological improvements as solutions to one or more of the above-mentioned technical problems recognized by the inventors in conventional systems. For example, in one embodiment, a method for scheduling a set of non-preemptive tasks in a multi-robot environment is provided, the method comprising: defining, by one or more hardware processors, a plurality of tasks, wherein each the plurality of tasks is a non-preemptive task characterized by an execution time, a specified time interval for completing the non-preemptive task and a performance loss function per time unit; partitioning, by a scheduling technique, the plurality of tasks into a set of schedulable tasks and a set of non-schedulable tasks, wherein the set of schedulable tasks comprise a subset of tasks to be executed within a predefined time interval and having a maximum performance loss value, and wherein the set of non-schedulable tasks comprise a subset of tasks failing to execute within the predefined time interval and with a low performance loss value; and scheduling, in a pre-defined order, the plurality of tasks partitioned by performing a plurality of steps wherein the plurality of steps comprise: (i) sorting, by the scheduling technique, the plurality of tasks partitioned in non-increasing order of one or more performance loss values corresponding to the plurality of tasks partitioned; (ii) scheduling the set of schedulable tasks in the multi-robot environment by assigning at least one of the set of schedulable tasks to each robot amongst a plurality of robots operating in the multi-robot environment by implementing a compaction mechanism, wherein the scheduling comprises: (a) determining, by the scheduling technique, a possibility of execution of each of the set of schedulable tasks in the multi-robot environment; (b) determining, by the scheduling technique, a possibility of scheduling a set of pre-assigned tasks amongst the plurality of robots, wherein the set of pre-assigned tasks comprise one or more tasks other than the set of schedulable tasks and the set of non-schedulable tasks; and (c) scheduling, by the compaction mechanism, the set of schedulable tasks in the multi-robot environment upon determining the possibility of execution of each of the set of schedulable tasks and the possibility of scheduling the set of pre-assigned tasks; and (iii) scheduling, by a list-scheduling technique, the set of non-schedulable tasks amongst the plurality of robots; categorizing, by the scheduling technique, one or more schedulable tasks amongst the set of schedulable tasks as a non-schedulable task upon determining either one of: (i) a least possibility of the execution of each of the schedulable task amongst the set of schedulable tasks; or (ii) a least possibility of scheduling the set of pre-assigned tasks; performing, based upon the one or more performance loss values corresponding to the plurality of tasks, a load balancing of the plurality of tasks partitioned, to optimize the scheduling of the set of non-preemptive tasks in the multi-robot environment; performing iteratively, the step of identification of the one or more non-schedulable tasks by implementing the scheduling technique, until each the set of non-schedulable tasks is scheduled in the multi-robot environment.

In another aspect, there is provided a system for scheduling a set of non-preemptive tasks in a multi-robot environment, the system comprising a memory storing instructions; one or more communication interfaces; and one or more hardware processors coupled to the memory via the one or more communication interfaces, wherein the one or more hardware processors are configured by the instructions to: define, a plurality of tasks, wherein each of the plurality of tasks is a non-preemptive task characterized by an execution time, a specified time interval for completing the non-preemptive task and a performance loss function per time unit; partition, by a scheduling technique, the plurality of tasks into a set of schedulable tasks and a set of non-schedulable tasks, wherein the set of schedulable tasks comprise a subset of tasks to be executed within a predefined time interval and having a maximum performance loss value, and wherein the set of non-schedulable tasks comprise a subset of tasks failing to execute within the pre-defined time interval and with a low performance loss value; and schedule, in a pre-defined order, the plurality of tasks partitioned by performing a plurality of steps wherein the plurality of steps comprise: (i) sort, by the scheduling technique, the plurality of tasks partitioned in non-increasing order of one or more performance loss values corresponding to the plurality of tasks partitioned; (ii) schedule the set of schedulable tasks in the multi-robot environment by assigning at least one of the set of schedulable tasks to each robot amongst a plurality of robots operating in the multi-robot environment by implementing a compaction mechanism, wherein the scheduling comprises, wherein the scheduling comprises: (a) determine, by the scheduling technique, a possibility of execution of each of the set of schedulable tasks in the multi-robot environment; (b) determine, by the scheduling technique, a possibility of scheduling a set of pre-assigned tasks amongst the plurality of robots, wherein the set of pre-assigned tasks comprise one or more tasks other than the set of schedulable tasks and the set of non-schedulable tasks; and (c) schedule, by the compaction mechanism, the set of schedulable tasks upon determining the possibility of execution of each of the set of schedulable tasks and the possibility of scheduling the set of pre-assigned tasks amongst the plurality of robots; and (iii) schedule, by a list-scheduling technique, the set of non-schedulable tasks amongst the plurality of robots; schedule the set of schedulable tasks by categorizing, via the scheduling technique, one or more schedulable tasks amongst the set of schedulable tasks as a non-schedulable task upon determining either one of: (i) a least possibility of the execution of each of the schedulable task amongst the set of schedulable tasks; or (ii) a least possibility of scheduling the set of pre-assigned tasks; schedule the plurality of tasks partitioned by performing, based upon the one or more performance loss values corresponding to the plurality of tasks, a load balancing of the plurality of tasks partitioned, to optimize the scheduling of the set of non-preemptive tasks in the multi-robot environment; and perform iteratively, by implementing the scheduling technique, the step of identification of the one or more non-schedulable tasks, until each of the set of non-schedulable tasks is scheduled in the multi-robot environment.

In yet another aspect, there is provided one or more non-transitory machine readable information storage mediums comprising one or more instructions which when executed by one or more hardware processors causes the one or more hardware processors to perform a method for scheduling a set of non-preemptive tasks in a multi-robot environment, the method comprising: defining, a plurality of tasks, wherein each the plurality of tasks is a non-preemptive task characterized by an execution time, a specified time interval for completing the non-preemptive task and a performance loss function per time unit; partitioning, by a scheduling technique, the plurality of tasks into a set of schedulable tasks and a set of non-schedulable tasks, wherein the set of schedulable tasks comprise a subset of tasks to be executed within a predefined time interval and having a maximum performance loss value, and wherein the set of non-schedulable tasks comprise a subset of tasks failing to execute within the predefined time interval and with a low performance loss value; and scheduling, in a pre-defined order, the plurality of tasks partitioned by performing a plurality of steps wherein the plurality of steps comprise: (i) sorting, by the scheduling technique, the plurality of tasks partitioned in non-increasing order of one or more performance loss values corresponding to the plurality of tasks partitioned; (ii) scheduling the set of schedulable tasks in the multi-robot environment by assigning at least one of the set of schedulable tasks to each robot amongst a plurality of robots operating in the multi-robot environment by implementing a compaction mechanism, wherein the scheduling comprises: (a) determining, by the scheduling technique, a possibility of execution of each of the set of schedulable tasks in the multi-robot environment; (b) determining, by the scheduling technique, a possibility of scheduling a set of pre-assigned tasks amongst the plurality of robots, wherein the set of pre-assigned tasks comprise one or more tasks other than the set of schedulable tasks and the set of non-schedulable tasks; and (c) scheduling, by the compaction mechanism, the set of schedulable tasks in the multi-robot environment upon determining the possibility of execution of each of the set of schedulable tasks and the possibility of scheduling the set of pre-assigned tasks; and (iii) scheduling, by a list-scheduling technique, the set of non-schedulable tasks amongst the plurality of robots; categorizing, by the scheduling technique, one or more schedulable tasks amongst the set of schedulable tasks as a non-schedulable task upon determining either one of: (i) a least possibility of the execution of each of the schedulable task amongst the set of schedulable tasks; or (ii) a least possibility of scheduling the set of pre-assigned tasks; performing, based upon the one or more performance loss values corresponding to the plurality of tasks, a load balancing of the plurality of tasks partitioned, to optimize the scheduling of the set of non-preemptive tasks in the multi-robot environment; performing iteratively, the step of identification of the one or more non-schedulable tasks by implementing the scheduling technique, until each the set of non-schedulable tasks is scheduled in the multi-robot environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2A through 2B is a flow diagram illustrating the steps involved in the process of scheduling the set of non-preemptive tasks in the multi-robot environment, in accordance with some embodiments of the present disclosure.

DETAILED DESCRIPTION

Figure 1:
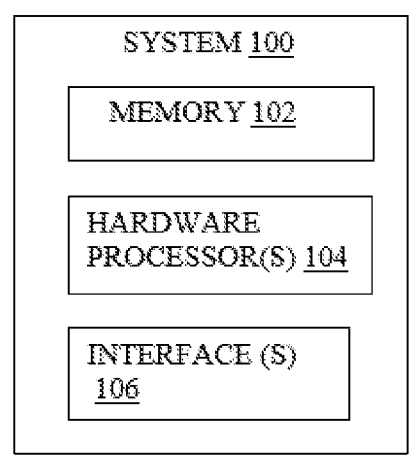
FIG. 1 illustrates a block diagram of a system for scheduling a set of non-preemptive tasks in a multi-robot environment, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide for systems and methods for scheduling a set of non-preemptive tasks in a multi-robot environment. In general, multi-robot task allocation comprises assigning tasks efficiently amongst robots to optimize task scheduling or task allocation. For example, task allocation in a warehouse, wherein objects are scheduled to be dispatched when a customer places an order for it, comprises fetching objects from storage racks to the packaging dock. Although the tasks may be homogeneous in nature, but they may differ based upon the storage location and weight of the item. In general, tasks are handled as a wave, where a wave can contains couple hundreds to thousands tasks. Once these tasks are completed, the next wave, which accumulates during the execution of the previous wave, is picked for execution.

The problem of scheduling a set of non-preemptive or atomic tasks to a plurality of homogeneous and autonomous robots in a smart environment, especially a smart warehouse environment, is closely similar to a non-preemptive scheduling or a sporadic process scheduling on a homogeneous multi-processors system. The goal is to schedule optimally a maximum number of the set of non-preemptive or atomic tasks within a deadline corresponding to each of the set of non-preemptive or atomic tasks. Further, since each of the set of non-preemptive or atomic tasks has a deadline and a performance loss attributed to it that may be incurred on a multi-robot system if any of the set of non-preemptive tasks is not completed within its corresponding deadline, the goal of a task scheduling system is to reduce the number of deadline misses and minimization of the performance loss.

Still further, since the available resources (especially robots) are fixed in number and a number of task in-flows may be very large during a particular time of the day and during a certain period of the year, and a large number of tasks are bound to miss their deadline during these high demand periods. For example, considering a scenario of the smart warehouse environment, movement of goods or objects in and out of the smart warehouse environment poses a major challenge in terms of scheduling of tasks (relating to the movement to goods). All the tasks imported in a wave of tasks are required to be finished as soon as possible using the limited number of resources (robots) and then the next wave is imported.

The traditional systems and methods, especially in warehouses implementing robots or related technologies, do not consider the deadline and the performance loss associated with each of the set of non-preemptive or atomic tasks and thus discard many tasks amongst the set of non-preemptive or atomic tasks if such non-preemptive tasks are bound to miss their deadlines. However, in general, each task in the smart warehouse environment has to be completed even if the corresponding deadline is surpassed. Partitioning the set of non-preemptive or atomic tasks and scheduling them on the multi-processors system (or a multi-core system) comprises s major task scheduling problem.

Further, most of the traditional systems and methods provide solution(s) wherein preemption is allowed, that is, a task may be preempted on one processor and later may be resumed on same or even another processor. However, such task scheduling techniques cannot be implemented in case of non-preemptive scheduling environments. Some of the traditional systems and methods have proposed non-preemptive scheduling techniques for the non-preemptive scheduling environments, however, such techniques cannot be implemented on the multi-processor systems and as discussed above, such techniques do not consider the performance loss and the deadline related aspects.

Hence, there is a need for a technology that provides for scheduling non-preemptive tasks on the multi-processor system, wherein each of the non-preemptive tasks have a corresponding deadline or performance loss value associated with it.

Referring now to the drawings, and more particularly to FIG. 1 through 6C, where similar reference characters denote corresponding features consistently throughout the figures, there are shown preferred embodiments and these embodiments are described in the context of the following exemplary system and/or method.

FIG. 1 illustrates an exemplary block diagram of a system 100 for scheduling a set of non-preemptive tasks in a multi-robot environment, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2A:
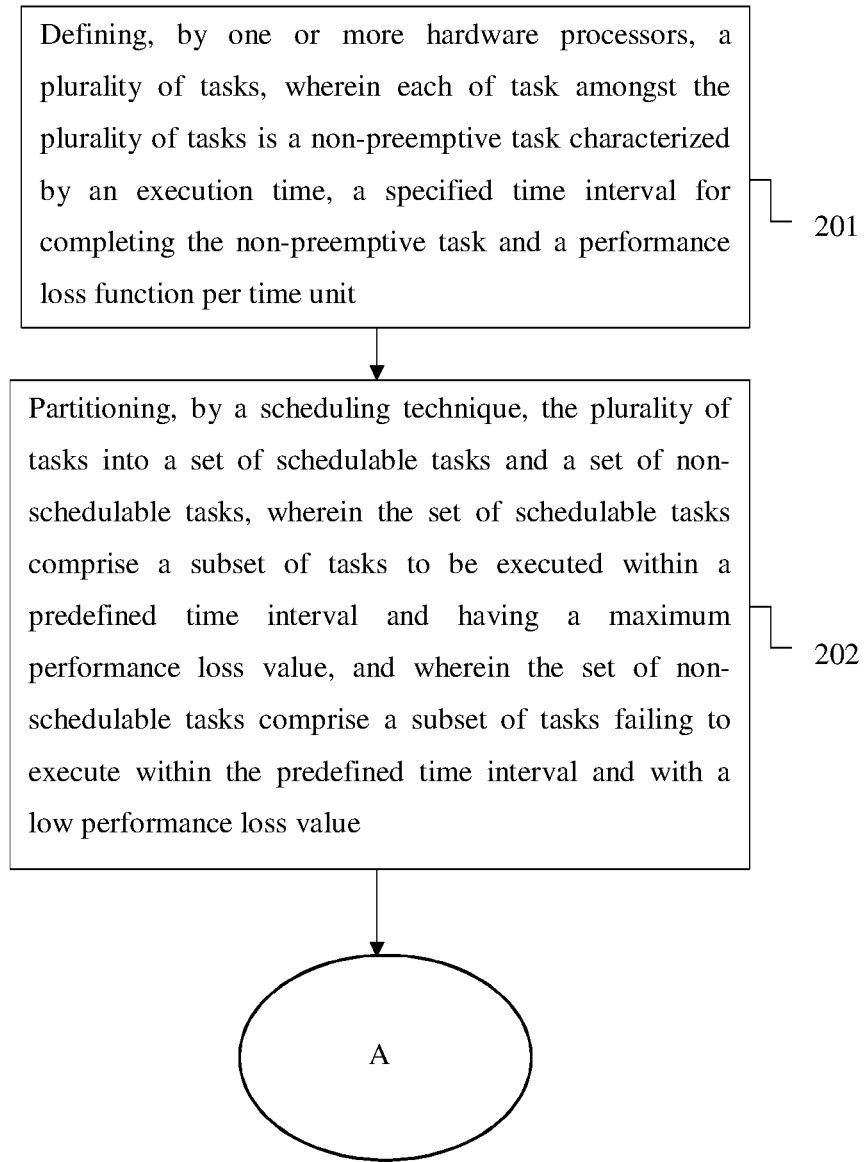

FIG. 2A through 2B, with reference to FIG. 1, illustrates an exemplary flow diagram of a method for scheduling the set of non-preemptive tasks in the multi-robot environment, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 201, the one or more hardware processors 104 define a plurality of tasks, wherein each of the plurality of tasks comprises a non-preemptive task characterized by an execution time (or a task execution time), a specified time interval for completing the non-preemptive task and a performance loss function per time unit. The term 'performance loss' as used herein may be understood to be similar to the term 'penalty' which is a commonly used term in a warehouse task scheduling, wherein task scheduling generally comprises corresponding 'deadlines' and 'penalties'. Further, although the proposed methodology has been explain with reference to a warehouse system, it may not be understood to be limited to warehouse system(s) only. The proposed methodology may be implemented or extended to all such environments/applications/technologies or related scenarios, wherein scheduling or task scheduling is performed using robots or related technologies.

The step of defining the plurality of tasks may be discussed in the light of a set of below assumptions.

Set of Assumptions—

(i) A wave of tasks is imported into a multi-robot platform, for example, a warehouse management system (WMS);

(ii) m homogeneous robots are available in the multi-robot platform or the WMS, wherein the homogeneous robots may carry and push objects one at a time;

(iii) A plurality of tasks (forming a set of tasks) T is available at the beginning of each wave amongst the wave of tasks, and a next wave or a further wave is available only post completion of all the tasks in a current wave, and by implementing available resources;

(iv) The multi-robot platform or the WMS communicates all required information, for example, a task-id, the task execution time, a deadline, a performance loss (or a penalty) about the plurality of tasks within a wave to a task scheduler;

(v) If a customer places an order for multiple goods, each good picked up is treated as a separate task. In this scenario, each of the plurality of tasks may have a different execution time. But, they are associated with an identical deadline and an identical performance loss value;

(vi) An actuation time is identical for each of the plurality of tasks and is not included in the task execution time, and thus, the task execution time comprises only a complete travel time for a robot;

(vii) Each of the plurality of tasks is atomic and non-preemptive. Once any of the task is started and assigned to a robot, it must be completed;

(viii) The multi-robot environment comprises a plurality of robots, wherein each of the plurality of robots have sufficient energy to finish all tasks assigned to it during a wave, and have a requisite knowledge of the corresponding warehouse environment (for example, the WMS); and (ix) A robot is never idle if there is a task in the queue awaiting execution.

As discussed above, the technical problem of allocating tasks to the plurality of robots may be mapped to a task scheduling on a multi-processor system (not shown in the figure). The plurality of tasks in a wave are to be partitioned amongst m identical robots, and the plurality of tasks are to be assumed so as to minimize the performance loss.

According to an embodiment of the present disclosure, the plurality of tasks (that is, the set of tasks) ($T=\{t_1, t_2, \ldots, t_n\}$) are available at a beginning of each wave amongst the set of waves imported into the multi-robot platform. In an embodiment, each of the plurality of tasks may be formally represented as $t_i=(e_i, d_i, p_i)$ for all $1 \leq i \leq n$, wherein $e_i$ is the execution time, $d_i$ is the deadline and $p_i$, is the performance loss. Further, there is a team of m warehouse identical robots $R=\{r_1, r_2, \ldots, r_m\}$. Tasks with a varying processing time (from the plurality of tasks) are to be scheduled amongst the m identical robots, while minimizing the performance loss. As mentioned above, if any task amongst the plurality of tasks missed corresponding deadline (of failed to execute within the corresponding deadline), a performance loss proportional to lateness may be imposed.

In an embodiment, the performance loss function may be defined as:

$$P(t_i)=\max(0,(c_i-d_i) \times p_i) \quad \text{equation (1)}$$

wherein $c_i$ represents a completion time for a task $t_i$, wherein $t_i$ corresponds to the plurality of tasks. Referring to equation (1), it may be noted that if a task is executed within a deadline, there is no performance loss but once the task fails to execute within the deadline (or misses the deadline), the performance loss increases proportional to time. The proposed disclosure thus provides for partitioning the plurality of tasks, that is, n tasks amongst m robots and an order of executing a subset of tasks assigned to a robot, wherein $T(r_j)$ denotes the subset of tasks assigned to robot $r_j$, and wherein the subset of tasks correspond to the plurality of tasks. Thus, an objective function of the task scheduler may be denoted by equation (2) below:

$$\min \Sigma_{i=1}^{n} P(t_i) \quad \text{equation (2)}$$

According to an embodiment of the present disclosure, at step 202, the one or more hardware processors 104 partition, by a scheduling technique, the plurality of tasks into a set of schedulable tasks and a set of non-schedulable tasks on the multi-processor system, wherein the set of schedulable tasks comprise a subset of tasks to be executed within a predefined time interval and having with a maximum performance loss value, and wherein the set of non-schedulable tasks comprise a subset of tasks failing to execute within the predefined time interval and with a low performance loss value.

Scheduling Technique—

The proposed disclosure facilitates partitioning and scheduling of the set of non-preemptive tasks (or sporadic tasks) on the multi-processor system and in the multi-robot environment, wherein each of the set of non-preemptive tasks has a deadline by implementing the scheduling technique disclosed herein. The scheduling technique thus further facilitates formulating and resolving the technical problem of the task scheduling on the multi-processor system to decide how the tasks with the varying processing time are to be assigned to each of the plurality of robots, along with the order of execution of each of such tasks (that is, the tasks with the varying processing time). The waves of tasks imported into the multi-robot platform thus serve as an input to the scheduling technique.

According to an embodiment of the present disclosure, the scheduling technique comprises two phases. In the first phase, the scheduling technique (implemented via the one or more hardware processors 104) attempts an assignment the set of schedulable tasks, that is, the scheduling technique assigns a maximum number of tasks (amongst the plurality of tasks) to a robot, wherein one or more high performance loss tasks are scheduled with a high priority. In the second phase, the scheduling technique attempts to assign the set of non-schedulable tasks accumulated in the first phase such that corresponding accumulated performance loss may also be minimized. The implementation of the scheduling technique to partition and schedule the set of non-preemptive tasks or the sporadic tasks having the deadline on the multi-processor system may now be considered in detail.

According to an embodiment of the present disclosure, the plurality of tasks may be initially partitioned by the one or more hardware processors 104 into the set of schedulable tasks and the set of non-schedulable tasks by implementing the scheduling technique. Thus, the set of n tasks are partitioned or split into m+1 disjoints sets, that is, $T(r_1)$, $T(r_2), \ldots, T(m), \overline{T}$, wherein $T(r_j)$ represents a subset of tasks that may be scheduled on a robot $r_j$, and $\overline{T}$ is a subset of tasks that are not schedulable on any of the plurality robots without violating the deadline of the set of schedulable tasks.

In an embodiment, the partitioning facilitates assigning the set of schedulable tasks to the one or more robots (amongst the plurality of robots) before the one or more robots begin movement at full speed. In other words, one or more of tasks amongst the plurality of tasks that may be accomplished with a zero performance loss value are assigned to the one or more robots most suitable to execute the set of schedulable tasks. Example of the sorting has been discussed in detail in paragraphs 52 to 54 below, wherein the set of schedulable tasks and the set of non-schedulable tasks are partitioned on processors P1 and P2.

According to an embodiment of the present disclosure, at step 203, the one or more hardware processors 104 schedule the plurality of tasks partitioned in a pre-defined order by performing a plurality of steps. At step 203(*i*), the one more hardware processors 104 sort, by implementing the scheduling technique, the plurality of tasks partitioned in non-increasing order of one or more performance loss values corresponding to the plurality of tasks partitioned.

Although the partitioning facilitates assigning the maximum number of tasks, however, the performance loss may still not be minimized. In an embodiment, the scheduling technique thus first sorts the plurality of tasks partitioned in non-increasing order of the one or more performance loss values, and based upon the sorting, considers the plurality of tasks partitioned for scheduling using a compaction mechanism (a known technique implemented for the task scheduling amongst robots). Examples of performance loss minimization have been discussed in detail in paragraphs 52 to 71 below. Further, as mentioned above, an example of the sorting has been discussed in detail in paragraphs 52 to 54 below.

According to an embodiment of the present disclosure, at step 203(*ii*), the one more hardware processors 104 schedule, by implementing the compaction mechanism, the set of schedulable tasks in the multi-robot environment by assigning at least one of the set of schedulable tasks to each robot amongst a plurality of robots operating in the multi-robot environment. The step of scheduling may now be considered in detail. In an embodiment, at step 203(*ii*)(*a*), the one or more hardware processors 104 determine, by the scheduling technique, a possibility of execution of each of the set of schedulable tasks in the multi-robot environment. Thus, to check if a task $t_l$ can be scheduled to a robot $r_k$ (amongst the m robots), both equations (3) and (4) (discussed below) are to be satisfied.

$$d_l - \left( \sum_{\substack{t_j \in T(r_j) \\ d_j \leq d_l}} e_j + e_l \right) \geq 0; \text{ and} \qquad \text{equation (3)}$$

$$\forall\, t_i \in T(r_j) : d_i > d_l : d_i - \left( \sum_{\substack{t_j \in T(r_j) \\ d_j \leq d_i}} e_j + e_l \right) \geq 0 \qquad \text{equation (4)}$$

wherein equation (3) facilitates enough space to execute the task $t_l$ after executing all the tasks scheduled on the robot $r_k$ and has a deadline smaller than $t_l$.

In an embodiment, at step 203(*ii*)(*b*), the one or more hardware processors 104 determine, by the scheduling technique, a possibility of scheduling a set of pre-assigned tasks amongst the plurality of robots, wherein the set of pre-assigned tasks comprise one or more tasks other than the set of schedulable tasks and the set of non-schedulable tasks. Thus, equation (4) facilitates that all the tasks scheduled on the robot $r_k$ (that is, the set of pre-assigned tasks) and have a deadline greater than $t_l$ may still be scheduled, if $t_l$ is scheduled as well.

In an embodiment, scheduling the set of schedulable tasks comprises categorizing, by the scheduling technique, one or more schedulable tasks amongst the set of schedulable tasks as a non-schedulable task upon determining either a least possibility of scheduling each of the set of schedulable tasks and/or a least possibility of scheduling the set of pre-assigned tasks. Thus, if either of the criteria fails, that is if either equation (3) or equation (4) are not satisfied for each of the plurality of robots, $t_l$ is added to $\overline{T}$, wherein $\overline{T}$ is the subset of tasks that are not schedulable on any of the plurality robots without violating the deadline of the set of schedulable tasks.

According to an embodiment of the present disclosure, at step 203(*ii*)(*c*), the one or more hardware processors 104 schedule the set of schedulable tasks in the multi-robot environment (on the multi-processor system) upon determining the possibility of scheduling each of the set of schedulable tasks and the possibility of scheduling the set of pre-assigned tasks in the multi-robot environment.

According to an embodiment of the present disclosure, at step 203(iii), the one or more hardware processors 104 schedule, by a list-scheduling technique, the set of non-schedulable tasks amongst the plurality of robots, wherein the scheduling is performed on the multi-processor system. In an embodiment, given the set of n tasks (that is n independent tasks) and the m robots with sequence dependent time set-ups, the list-scheduling technique may be implemented to process a plurality of jobs without preemption on exactly one of robot amongst the m robots during a non-negative time, equal to an execution time of a job amongst the plurality of jobs.

In an embodiment, as soon as any of the plurality of robots becomes available to execute a next task, the available robot may pick a task at the front of a queue. Since each of the m robots are identical, each of the m robots takes identical time to execute a specific task. Hence, in case more than one robot is available pick the task at the front of the queue, a robot with a lower robot-id may assigned the task. None of the m robots remain idle until each of the plurality of tasks is complete.

Although the scheduling technique partitions and schedules the set of non-preemptive tasks (or the sporadic tasks) on the multi-processor system and in the multi-robot environment and minimized the performance loss, yet, in some cases makespan (discussed later in paragraphs 62 to 71) may increase, as during the first phase the set of schedulable tasks may get assigned to first robot (with a least robot-id) on which the set of schedulable tasks are schedulable, thereby overloading robots with a smaller robot-id.

In an embodiment, to overcome the problem discussed above, the one or more hardware processors 104 perform a load balancing of the plurality of tasks partitioned to optimize the scheduling of the set of non-preemptive tasks on the multi-processor system and in the multi-robot environment, wherein the load balancing is performed based upon the one or more performance loss values corresponding to the plurality of tasks. Thus, the scheduling technique facilitates load balancing of the plurality of tasks partitioned amongst the plurality of robots at the end of the second phase, without any tradeoff in overall performance loss. A detailed example of the optimization has been discussed in paragraphs 52 to 56 below.

According to an embodiment of the present disclosure, initially, during the load balancing, the first and the second phase are marginally tweaked. Thus, the load balancing comprises a re-arrangement of the one or more schedulable tasks and one or more non-schedulable tasks based upon an identical performance loss value, wherein the identical performance loss value corresponds to the one or more schedulable tasks and one or more non-schedulable tasks, and wherein the one or more schedulable tasks and the one or more non-schedulable tasks correspond to the set of schedulable tasks and the set of non-schedulable tasks respectively. During the load balancing, in the first phase, a sorting of an initial task-set T may be performed in non-increasing order of the one or more performance loss values. One or more sorted list tasks (from tasks under sorted list) may have the identical performance loss value.

In an embodiment, the one or more sorted list tasks having the identical performance loss value are rearranged amongst themselves, based upon a slack time of each of the one or more sorted list tasks in an increasing order, wherein the slack time is defined by $(d_i-e_i)$. The sorted list may then by passed by the one or more hardware processors 104 to the compaction mechanism. Further, in the second phase, unlike scheduling in $\overline{T}$ by implementing the list-scheduling technique, the scheduling technique works on the principle of scheduling a right task at a right time.

In an example implementation, suppose tasks $t_a$ and $t_b$ are scheduled in an order of $t_a$, $t_b$, and further incur a performance loss P, a smaller execution time of $a(e_a)$ resulting in a lesser delay $t_b$ in the beginning, and thereby resulting in a lower performance loss value, that is, $(P \propto e)$. If a deadline d of delayed task $t_b$ is greater, the performance loss value on the multi-robot platform (for example, the WPS) is less. Further, for an identical execution time and an identical deadline corresponding to both $t_a$ and $t_b$, the task with a greater performance loss per unit time step delay p holds a higher precedence in the order of execution $(P \propto p)$.

Thus, a priority of a task may be determined using equation (5) below.

$$\forall t_i \in \overline{T}, \{p_i \times (t-d_i)\} + e_i \qquad \text{equation (5)}$$

wherein t denotes time at which a robot is ready to take up a new task.

In an embodiment, the load-balancing comprises an identification of the one or more non-schedulable tasks with a maximum priority value from the set of non-schedulable tasks, by implementing the scheduling technique. The one or more non-schedulable tasks with a maximum priority value are removed from $\overline{T}$, and are assigned to the first robot $r_j$, $1 \le j \le m$, that is idle or finishes an earlier task at time t. The process is re-iterated over $\overline{T}$, until each the set of non-schedulable tasks is scheduled in the multi-robot environment, by assigning to any of robot amongst the plurality of robots.

Thus, the proposed disclosure by implementing the scheduling technique, help in an identification of any of tasks (amongst the plurality of tasks) that may result in a minimum performance loss, if delayed for some time. At the end of the second phase, the proposed methodology load balances tasks amongst the plurality of robots so improve makespan and avoid exhaustion of any of the plurality of robots. As discussed above, the idle robot picks up or selects the task $t_i$ from an overloaded robot only upon ensuring a possibility of non-violation of tasks already scheduled. Thus, the proposed methodology improves makespan without any comprise in the overall performance loss in the multi-robot environment of the multi-processors system.

In an embodiment, the sorting, the partitioning, the scheduling of the set of schedulable tasks and the set of non-schedulable tasks, and the optimization with minimization of the performance loss may be explained with the help of below example.

TABLE 1

| Task | $e_i$ | $d_i$ | $p_i$ |
|------|-------|-------|-------|
| t1   | 6     | 10    | 1     |
| t2   | 7     | 10    | 2     |
| t3   | 7     | 10    | 2     |
| t4   | 4     | 10    | 2     |

Referring to Table 1 above, let there be set of four tasks, that is, T={t1, t2, t3, t4} characterized by execution time $e_i$, deadline $d_i$, performance loss $p_i$, to be scheduled on processors P1 and P2.

Case 1—In an embodiment, sorting the set of four tasks based upon deadline in an increasing order results in a task list in an order {t1, t2, t3, t4}, which may be considered for scheduling. The possible schedule may comprise as:

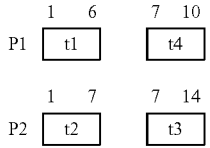

In an embodiment, initially the task $t_1$ is scheduled on P1. Then the task t2 is scheduled on P2, as the task t2 is not schedulable on P1 within its deadline. The task $t_3$ is not schedulable on either of the processors (P1 or P2) within its deadline, hence categorized as a non-schedulable task. Further, the task t4 is scheduled on the processor P1, as the processor P1 has enough empty space to adjust the task t4 within its corresponding deadline. This process continues if there are more tasks and they are schedulable within their deadline (which is not necessarily 10 for all of them). At the end the set of non-schedulable tasks (in this case only the task t3) are scheduled using the list-scheduling. The list scheduling thus comprises processing a sorted list using first-come-first-serve, where sorting criteria can be varied (in this case using deadline). Further, with given schedule, the task t3 finishes its execution 4 units after its deadline incurring a performance loss of 2×4=8 units. Tasks t1, t2 and t4 are completed within their defined deadline and do not incurred any performance loss.

Case 2—Sorting the set four of tasks in the non-increasing order results in a task list in an order {t2, t3, t1, t4}. In this scenario, the possible schedule may comprise:

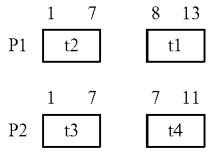

Here the tasks t1 and t4 miss deadline incurring a performance loss 3×1=3 unit and 1×1=1 unit respectively, the overall system performance loss being 4 unit. In case of tasks being sorted by their deadline (in the increasing order), though the number of tasks missing deadline may be fewer than the case where tasks are sorted by performance loss (in the non-increasing order), the overall performance loss is much higher. This is because, the sorting of the tasks based upon the performance loss results in scheduling of tasks with higher performance loss value with higher priority, thereby minimizing the overall system performance loss.

Considering another example scenario for the optimization, referring to Table 2 below, let there be set of three tasks, that is, T={t1, t2, t3} characterized by execution time $e_i$, deadline $d_i$, performance loss $p_i$ to be scheduled on processors P1 and P2.

TABLE 2

| Task | $e_i$ | $d_i$ | $p_i$ |
|---|---|---|---|
| t1 | 6 | 10 | 1 |
| t2 | 7 | 10 | 2 |
| t3 | 7 | 10 | 2 |

Case 1—In case of a preemptive scheduling, the possible scheduling scenario may comprise:

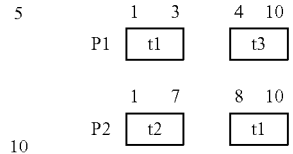

Case 2—In case of a non-preemptive scheduling, the possible scheduling scenario may comprise:

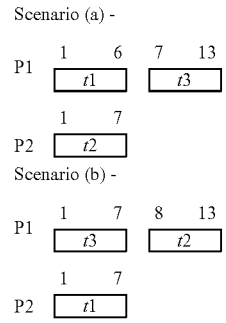

In both the scenarios (a) and (b) depicted above for non-preemptive scheduling, each of the tasks are completed by the processor to which it is assigned, unlike, in case of preemptive scheduling wherein the task t1 executes on the processor P1 before it is preempted after time unit 3 and later resumes execution on the processor P2 and continues till completion. In case of preemptive scheduling, none of the tasks missed their deadline, incurring zero performance loss. On the contrary, where tasks are non-preemptive in nature, the tasks t3 and t1 miss deadline in scenario (a) and (b), respectively. In scenario (a), t3 finishes its execution 3 unit after its deadline incurring a performance loss of 2×3=6 unit. Similarly, in (b), t3 completes execution 3 unit after its deadline but results in only 3×1=3 unit of performance loss.

According to an embodiment of the present disclosure, robustness, results, technical advantages, the performance loss minimization and a comparison of the proposed disclosure with traditional systems and methods may now be considered in detail Datasets—

As discussed above, each of the plurality of tasks may be formally represented as $t_i=(e_i, d_i, p_i)$ for all $1 \le i \le n$, wherein $e_i$ is the execution time, $d_i$ is the deadline and $p_i$ is the performance loss. Further, execution time of each of the plurality of tasks is equivalent to from and back distance from a task location and a packaging dock, in the WPS. A set of coordinates corresponding to the task location and the packaging dock were obtained from a standard capacity-constraint vehicle routing problem (CVRP) dataset.

In an embodiment, results of two different sets, comprising of 100 and 1000 tasks respectively may be discussed. For each of the two sets, five different datasets comprising one or more pseudo-random deadlines were generated. The strategy to associate the one or more pseudo-random deadlines is identical to a standard procedure to generate a data in a real-time scheduling domain.

$d_i=e_i$, wherein a deadline $d_i$ of task is set identical to corresponding execution time $e_i$. In this case, only m (that is, total available number of robots) tasks meet deadline, while a large number of tasks are bound to miss deadlines. Although a rare scenario, but considered to highlight the efficiency of the proposed disclosure;

$d_i = 2e_i$, wherein the deadline $d_i$ of task is set to twice the corresponding execution time $e_i$. Although the number of tasks missing deadline may still be high, but considered to highlight the efficiency of the proposed disclosure;

$d_i \in [e_i, 10e_i]$, wherein the deadline $d_i$ is set to a random value in the range of $e_i$, $10e_i$, wherein $e_i$, $10e_i$ are randomly distributed;

$d_i \in [5e_i, 10e_i]$, wherein the deadline $d_i$ is set using a uniform distribution in the range of $5e_i$, $10e_i$. This represents a scenario wherein a large number of tasks are schedulable within corresponding deadline each of the large number of tasks (if not all); and d←mix, comprising a mix of all previous four datasets with an equal probability to ensure that the task scheduler is not favoring a particular distribution of deadline.

In an embodiment, for each of 10 datasets generated (5 each for 100 and 1000 tasks), the one or more hardware processors 104 generate three datasets each with a different performance loss. In an embodiment, if associated performance loss is $p_i$ for a task $t_i$, the incurred performance loss (value) may be computed using equation (1).

p←[1, 10], wherein a performance loss is set to one or more random values generated using a uniform distribution in the range of 1 and 10;

p←same, wherein the performance loss is set to one identical value, for example 10, for each of the plurality of tasks; and p←extreme[1 or 10], wherein the performance loss is set to either of two extreme values, that is 1 or 10, with an equal probability.

According to an embodiment of the present disclosure, the comparison of the proposed methodology with the traditional systems and methods, that is Demand Bound Function (DBF), may now be considered in detail. Since the goal of the DBF is to minimize the number of deadline misses, it discards tasks not schedulable. In one embodiment, upon extending the DBF, the tasks not schedulable initially under the DBF were scheduled under the list-scheduling technique, and the performance loss was computed.

As is known in the art, the DBF selects non-increasing order of execution time as the sorting criteria, while sequentially checking the schedulability of the tasks. Although sequentially checking the schedulability of the tasks may result in a high schedulability in some environments, it may not result in minimizing the performance loss, while completing all the tasks. Thus, using an alternate version of the DBF, that is Demand Bound Function (Alternate) or DBF (Alternate), wherein the alternate version sorts the tasks based upon non-increasing order of performance loss.

In an embodiment, a comparison of the proposed scheduling technique, including the load balancing was performed with the DBF and the DBF (Alternate), wherein the comparison was performed based upon the overall performance loss incurred while completing each of the tasks, the number of deadline miss, and makespan of the wave, that is, time when a last task finishes execution, considering each of the plurality of robots work in parallel. The incurred performance loss depends on the number of tasks in a wave and the number of available robots.

In an embodiment, for the datasets with 100 tasks, the number of robots were fixed to 10, while the number of available robots were varied for the datasets with 1000 tasks starting between 10 and 140 robots, thereby determining how robust the task scheduler is with varying number of resources, and how does the performance improves with the increasing number of resources.

Figure 3A:
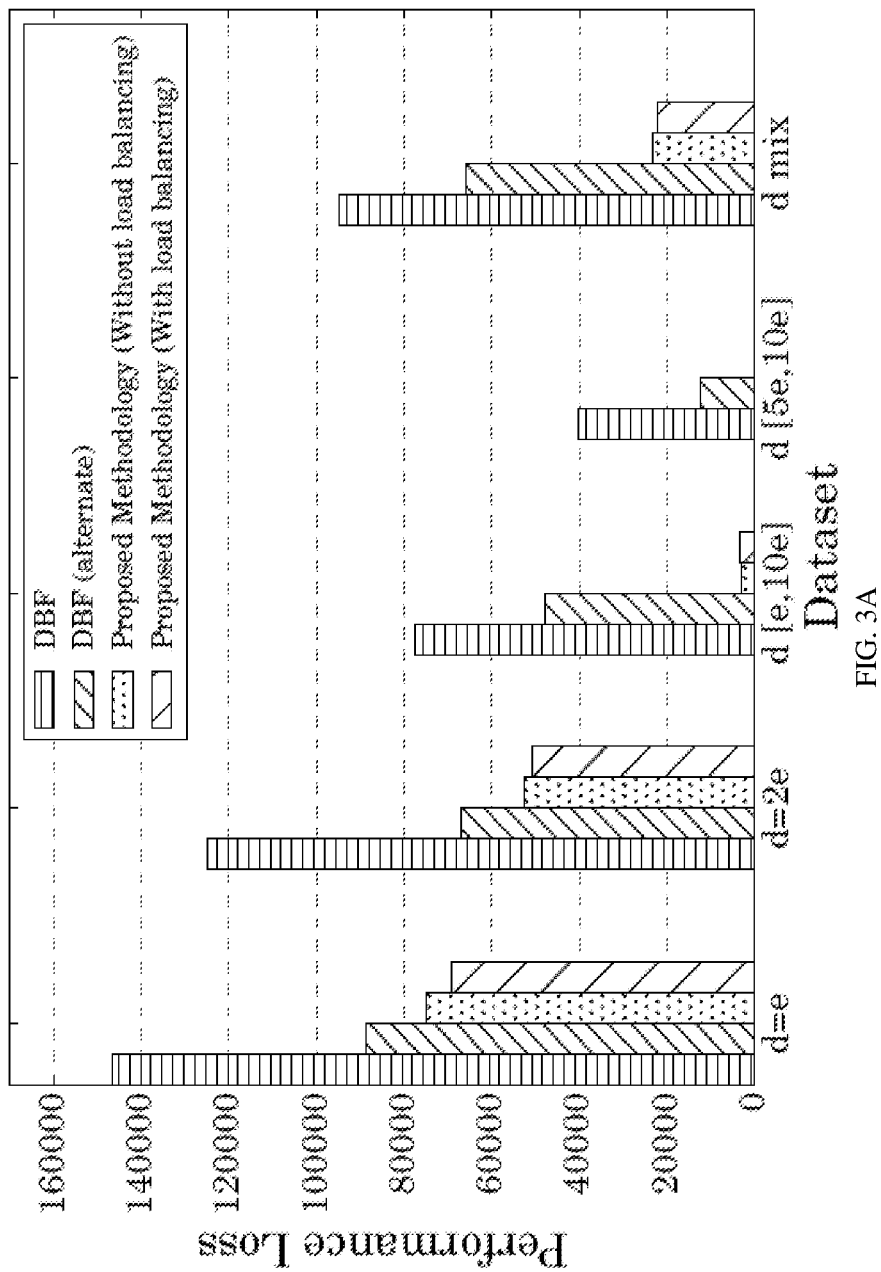
FIG. 3A through 3C illustrates graphically a performance comparison of the proposed methodology (with and without load balancing) with traditional systems and methods (that is, Demand Bound Function (DBF) and Demand Bound Function (Alternate) or DBF (Alternate)), wherein a set of hundred non-preempted tasks by ten robot systems were performed for five different deadlines using the proposed methodology (with and without the load balancing) and also using the traditional systems and methods (that is, the DBF and the DBF (Alternate)), and wherein performance loss is set to a random value between 1 to 10, in accordance with some embodiments of the present disclosure.
Figure 3B:
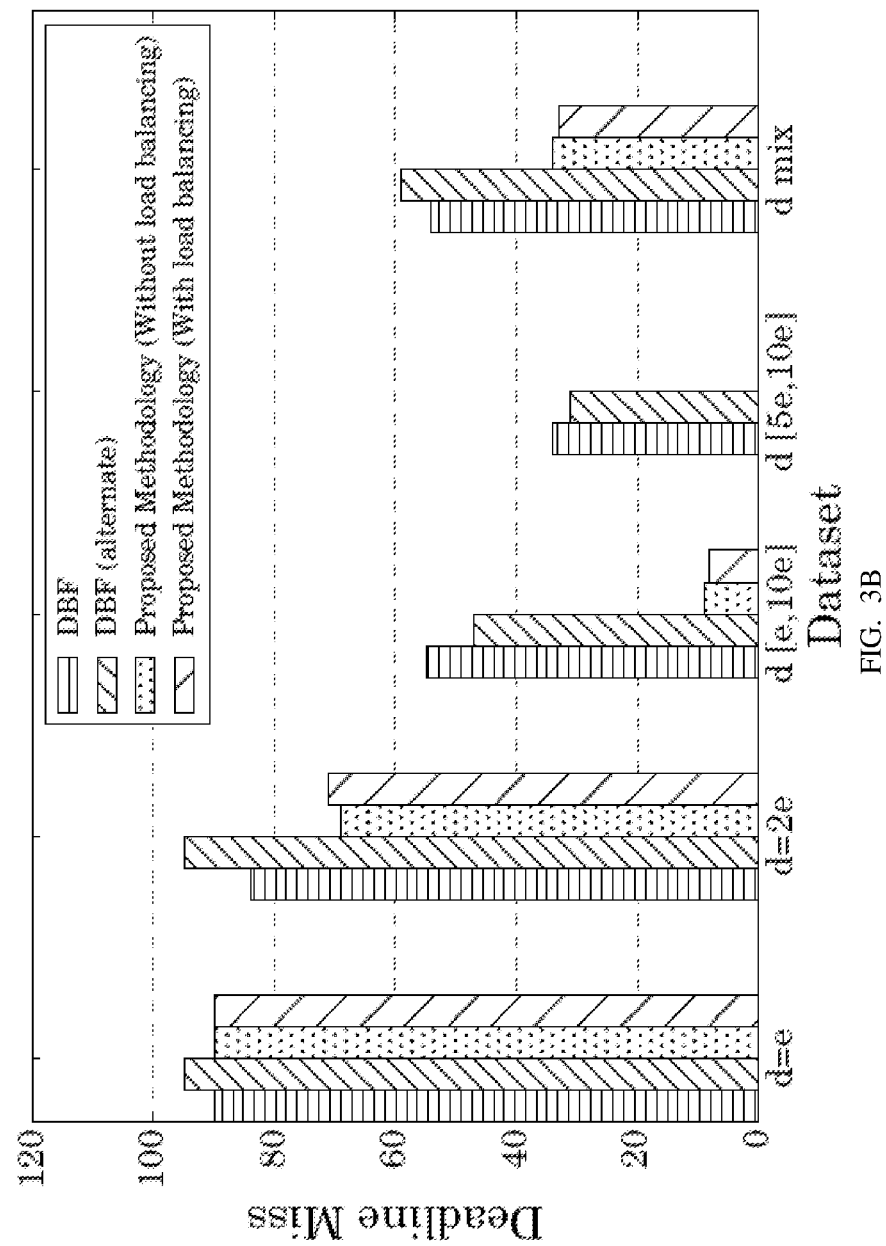
Figure 3C:
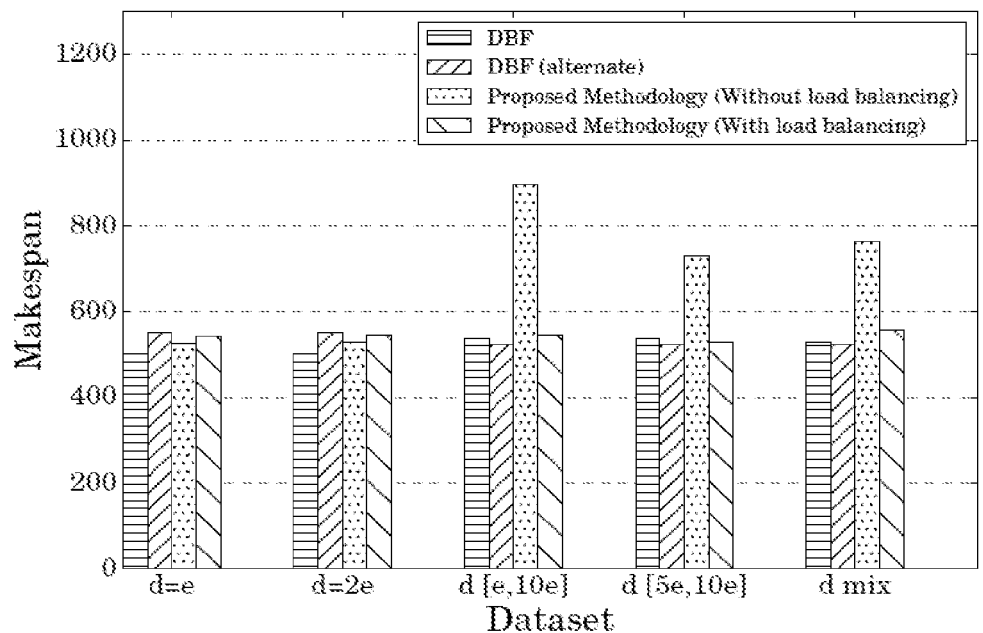

According to an embodiment of the present disclosure, referring to FIG. 3A through 3C, based upon the overall performance loss incurred, the number of deadline miss, and makespan of the wave for 100 tasks and 10 robots, results obtained by implementing the proposed methodology (with and without load balancing), the DBF and the DBF (Alternate) may be considered. In an embodiment, the deadline may be set to five different values and the performance loss may be set to a random number between 1 and 10 as discussed above. Referring to FIG. 3A through 3C again, it may be noted that the proposed methodology outperforms the traditional systems and methods, that is the DBF and the DBF (Alternate) significantly in terms of the overall performance loss incurred.

Referring to FIG. 3A through 3C yet again, it may be noted that by implementing the proposed methodology, the task scheduler incurs almost no performance loss when the tasks have greater deadlines. Referring to FIG. 3B, it may be noted that the proposed methodology minimizes a number of tasks missing deadlines as compared to the DBF, which further proves that the task scheduler incurs almost no performance loss when the tasks have greater deadlines. This is because the proposed methodology implements the compaction mechanism while maximizing the schedulable tasks, as compared to the traditional systems and methods, for example, the DBF and the DBF (Alternate) which implement a variation of a demand bound function, wherein a task may be scheduled on a robot only if it there is enough space for the task with largest execution time amongst the set of unscheduled tasks. Thus, the traditional systems and methods leave some of the tasks unscheduled, which can be scheduled by implementing the proposed methodology.

As discussed above, the proposed methodology attempts to assign the maximum number of tasks to the busiest robot, thereby keeping some of robots amongst the plurality of robots little occupied, and thus the robots with little occupancy may be assigned a few set of tasks from the second phase (that is, from the set of non-schedulable tasks) within a little time. Early beginning of tasks missing deadline reduces the overall performance loss incurred. However, referring to FIG. 3C, a spike in the makespan may be referred, which is overcome by implementing the load balancing at the end of the second phase. Further, referring to FIG. 3C again, it may be noted that the sorting mechanism implemented by the proposed methodology while performing the load balancing results in further improvement of makespan. Due to each of the reasons discussed above, the proposed disclosure minimized the performance loss.

Figure 4:
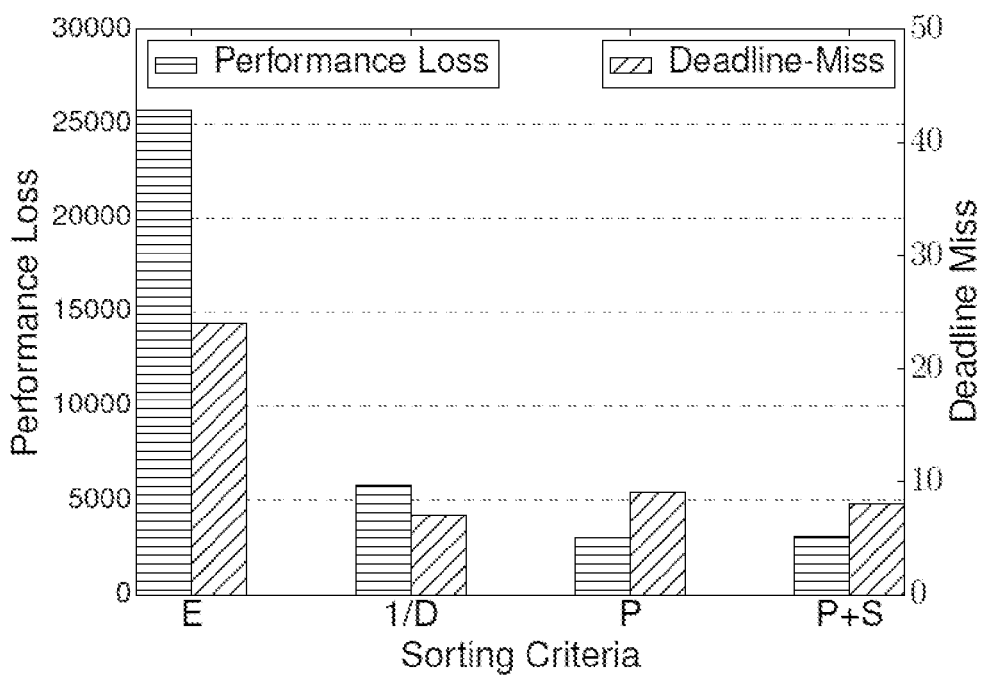
FIG. 4 illustrates graphically a sorting performed using the proposed methodology with the load balancing, in accordance with some embodiments of the present disclosure.

Referring to FIG. 4, it may be noted that the sorting performed by the proposed methodology not only minimized the performance loss, but further minimized the number of deadlines misses, in comparison to higher execution time first (that is, non-increasing E) and an earliest deadline first (non-increasing 1÷D).

According to an embodiment of the present disclosure, in order to determine the robustness of the proposed scheduling technique, the performance of all 15 datasets was evaluated with 100 tasks and 10 robots. Referring to Tables 3 and 4 below, results of the evaluation may be referred, wherein P denotes a performance loss, DL-M denotes a deadline miss, and MS denotes makespan. Referring to Tables 3 and 4 again, it may be noted that the performance loss values shown in Tables 3 and 4 are ¹/₁₀₀th of actual performance loss accumulated.

Figure 5A:
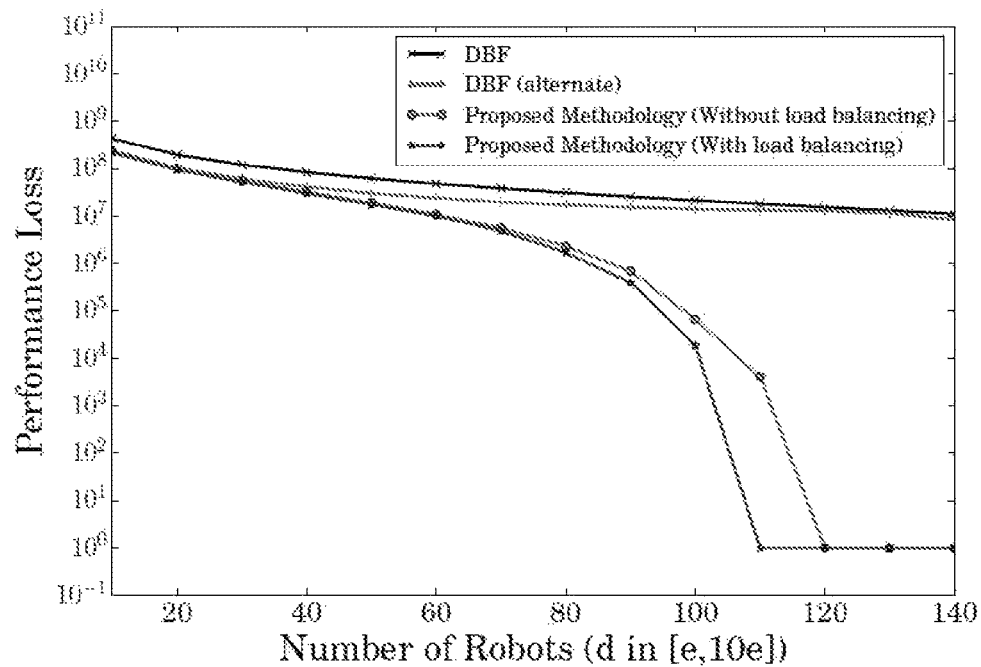
FIG. 5A through 5C illustrates graphically a comparison of a set of one thousand non-preempted tasks performed using the proposed methodology (with and without the load balancing) and also using the traditional systems and methods (that is, the DBF and the DBF (Alternate)) in case of linearly increasing robots in the multi-robot environment, wherein a deadline is uniformly distributed between $e_i$ and $10e_i$, and wherein the performance loss is uniformly distributed between 1 and 10, in accordance with some embodiments of the present disclosure.
Figure 5B:
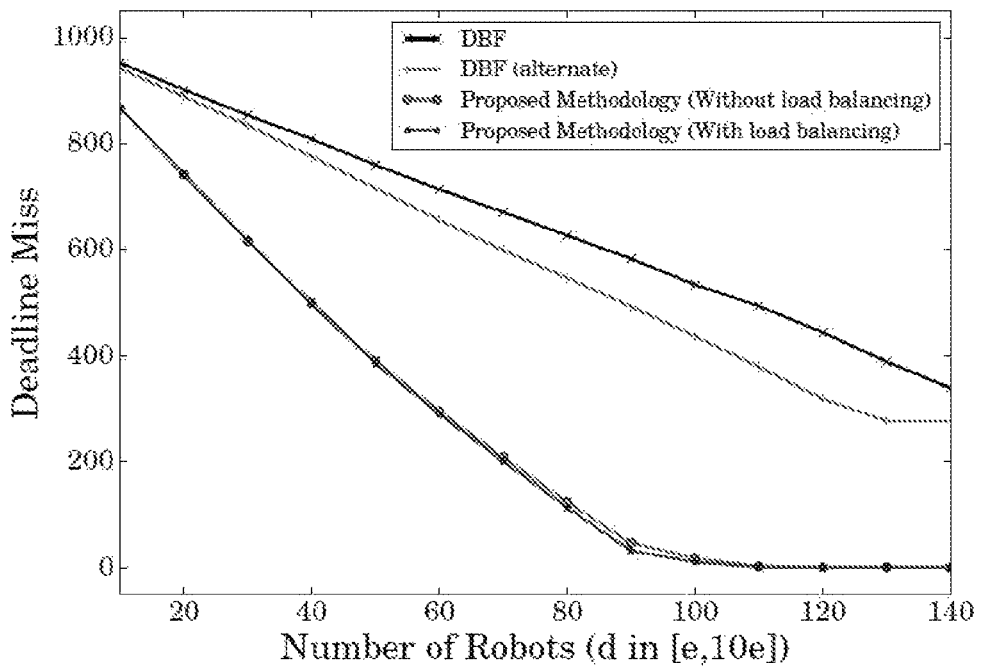
Figure 5C:
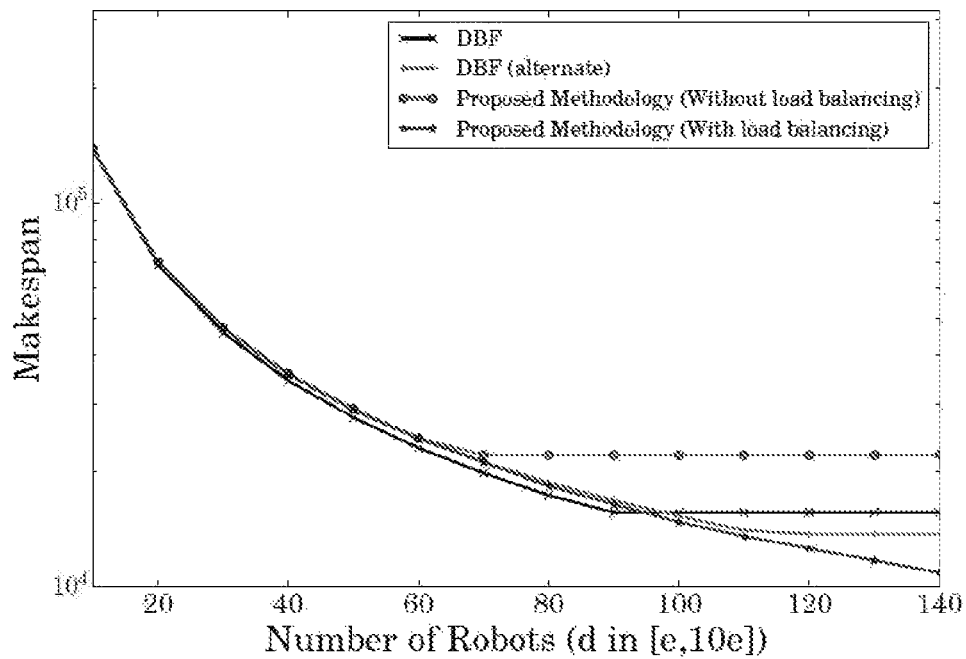

Referring to Tables 3 and 4 yet again, it may be noted that the proposed methodology, by implementing the proposed scheduling technique, always outperforms the traditional systems and methods for example, the DBF, with respect to performance loss and deadline miss, even when all tasks have the identical performance loss value, or even an extreme performance loss value. The proposed methodology, by implementing the scheduling technique, sacrifices makespan in order to minimize the performance loss value. However, by implementing the load balancing, overcomes the problem of makespan.

or improves multi-fold with increasing number of robots, as compared to a marginal increase in performance of the traditional systems and methods, for example, the DBF. Referring to FIG. 5B, it may be note that the deadline miss count reaches zero with 110 robots, while the DBF still incurs a significant number of deadline misses.

Figure 6A:
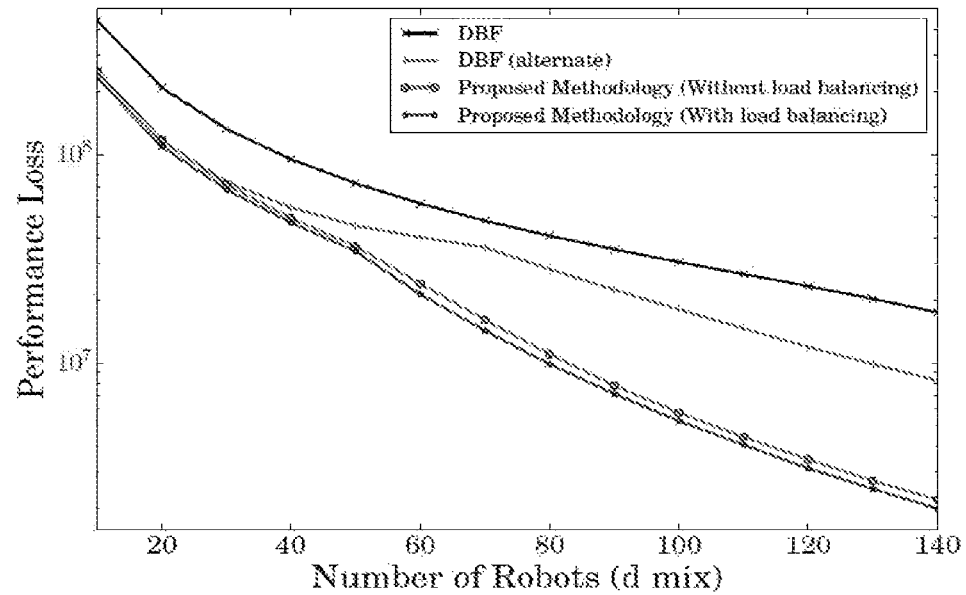
FIG. 6A through 6C illustrates graphically a comparison of the set of one thousand non-preempted tasks performed using the proposed methodology (with and without the load balancing) and also using the traditional systems and methods (that is, the DBF and the DBF (Alternate)) in case of linearly increasing robots in the multi-robot environment, wherein the deadline comprises a mix of four different distributions, and wherein the performance loss is uniformly distributed between 1 and 10, in accordance with some embodiments of the present disclosure.
Figure 6B:
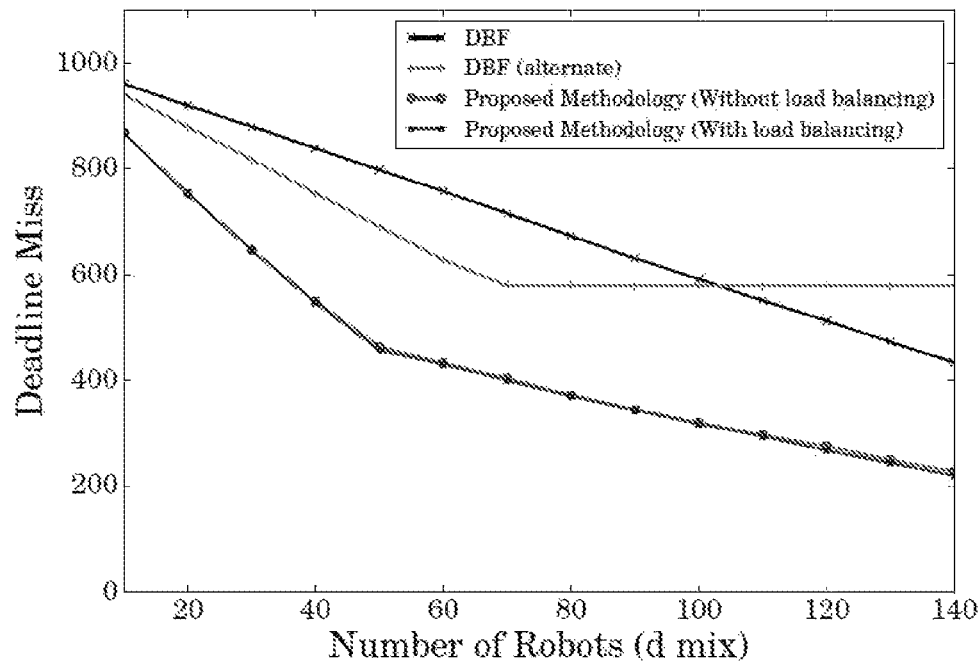
Figure 6C:
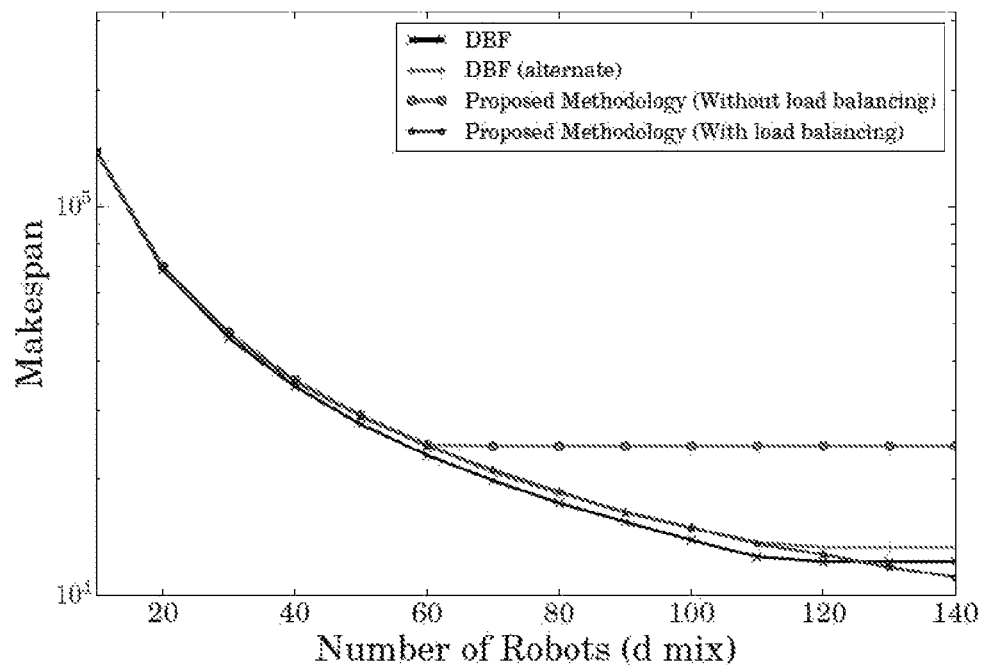

Although makespan of the scheduling technique is equivalent of makespan of the DBF, it may be higher than makespan of the DBF in case of less number of robots. However, referring to FIG. 5C, it may be noted that as the number of robots increase, the proposed scheduling technique surpasses the traditional systems and methods in terms of makespan as well (particularly at 80 robots). Referring to FIG. 6A through 6C, a comparison of the set of one thousand non-preempted tasks performed using the proposed methodology (with and without the load balancing) and also

TABLE 3

| Performance loss | Deadline | DBF | | | DBF (Alternate) | | |
|---|---|---|---|---|---|---|---|
| | | $P(10^2 X)$ | DL-M | MS | $P(10^2 X)$ | DL-M | MS |
| $p \leftarrow [1, 10]$ | $d_i = e_i$ | 1465 | 90 | 502 | 886 | 95 | 550 |
| | $d_i = 2e_i$ | 1246 | 84 | 500 | 669 | 95 | 550 |
| | $d_i \in [e_i, 10e_i]$ | 776 | 55 | 536 | 476 | 47 | 524 |
| | $d_i \in [5e^i, 10e^i]$ | 400 | 34 | 536 | 122 | 31 | 524 |
| | d ← mix | 947 | 54 | 528 | 657 | 59 | 522 |
| $p \leftarrow$ same | $d_i = e_i$ | 276 | 90 | 502 | 235 | 93 | 518 |
| | $d_i = 2e_i$ | 234 | 84 | 500 | 191 | 93 | 518 |
| | $d_i \in [e_i, 10e_i]$ | 140 | 55 | 536 | 121 | 48 | 522 |
| | $d_i \in [5e_i, 10e_i]$ | 75 | 34 | 536 | 59 | 32 | 522 |
| | d ← mix | 185 | 54 | 528 | 165 | 57 | 518 |
| $p \leftarrow$ extreme | $d_i = e_i$ | 1587 | 90 | 502 | 940 | 93 | 518 |
| | $d_i = 2e_i$ | 1352 | 84 | 500 | 668 | 93 | 518 |
| | $d_i \in [e_i, 10e_i]$ | 857 | 55 | 536 | 474 | 46 | 526 |
| | $d_i \in [5e_i, 10e_i]$ | 521 | 34 | 536 | 166 | 34 | 524 |
| | d ← mix | 1071 | 54 | 528 | 603 | 57 | 518 |

TABLE 4

| Performance loss | Deadline | Proposed methodology (without load balancing) | | | Proposed methodology (with load balancing) | | |
|---|---|---|---|---|---|---|---|
| | | $P(10^2 X)$ | DL-M | MS | $P(10^2 X)$ | DL-M | MS |
| $p \leftarrow [1, 10]$ | $d_i = e_i$ | 748 | 90 | 526 | 691 | 90 | 542 |
| | $d_i = 2e_i$ | 524 | 69 | 528 | 505 | 71 | 544 |
| | $d_i \in [e_i, 10e_i]$ | 30 | 9 | 896 | 31 | 8 | 544 |
| | $d_i \in [5e_i, 10e_i]$ | 0 | 0 | 730 | 0 | 0 | 530 |
| | d ← mix | 232 | 34 | 764 | 219 | 33 | 556 |
| $p \leftarrow$ same | $d_i = e_i$ | 225 | 90 | 528 | 175 | 90 | 544 |
| | $d_i = 2e_i$ | 176 | 70 | 528 | 135 | 64 | 550 |
| | $d_i \in [e_i, 10e_i]$ | 25 | 12 | 898 | 10 | 8 | 536 |
| | $d_i \in [5e_i, 10e_i]$ | 0 | 0 | 792 | 0 | 0 | 528 |
| | d ← mix | 87 | 34 | 812 | 63 | 33 | 536 |
| $p \leftarrow$ extreme | $d_i = e_i$ | 722 | 90 | 526 | 595 | 90 | 556 |
| | $d_i = 2e_i$ | 476 | 73 | 526 | 365 | 65 | 540 |
| | $d_i \in [e_i, 10e_i]$ | 23 | 11 | 888 | 12 | 8 | 542 |
| | $d_i \in [5e_i, 10e_i]$ | 0 | 0 | 750 | 0 | 0 | 524 |
| | d ← mix | 124 | 34 | 796 | 109 | 35 | 544 |

According to an embodiment of the present disclosure, in order to determine the scalability of the proposed scheduling technique, the performance was evaluated with 1000 tasks as well. Referring to FIG. 5A through 6C, it may be noted that the performance of the proposed methodology increases using the traditional systems and methods (that is, the DBF and the DBF (Alternate)) in case of linearly increasing robots in the multi-robot environment, wherein the deadline comprises a mix of four different distributions, and wherein the performance loss is uniformly distributed between 1 and 10 may be referred. Further, referring to Tables 5 and 6 below, a comprehensive performance analysis for the dataset with 1000 tasks and 80 robots with different performance loss settings and two performance loss sets $d_i \in [e_i, 10e_i]$ and d←mix may be observed, wherein P denotes a performance loss, DL-M denotes a deadline miss, and MS denotes makespan.

TABLE 5

| Performance loss | Deadline | DBF | | | DBF (Alternate) | | |
|---|---|---|---|---|---|---|---|
| | | $P(10^3 X)$ | DL-M | MS | $P(10^3 X)$ | DL-M | MS |
| | $d_i \in [e, 10_e]$ | 31211 | 627 | 17314 | 17258 | 547 | 18708 |
| | d ← mix | 40732 | 673 | 17310 | 28210 | 579 | 18340 |
| | $d_i \in [e, 10_e]$ | 5622 | 627 | 17314 | 4146 | 549 | 18534 |
| | d ← mix | 7352 | 673 | 17310 | 6140 | 577 | 18500 |
| | $d_i \in [e, 10_e]$ | 31662 | 627 | 17314 | 14803 | 545 | 18456 |
| | d ← mix | 39554 | 673 | 17310 | 24326 | 578 | 18406 |

TABLE 6

| Performance loss | Deadline | DBF | | | DBF (Alternate) | | |
|---|---|---|---|---|---|---|---|
| | | $P(10^3 X)$ | DL-M | MS | $P(10^3 X)$ | DL-M | MS |
| | $d_i \in [e, 10_e]$ | 2331 | 124 | 22042 | 1707 | 113 | 18286 |
| | d ← mix | 11037 | 372 | 24246 | 9878 | 370 | 18528 |
| | $d_i \in [e, 10_e]$ | 1311 | 123 | 23762 | 978 | 109 | 18318 |
| | d ← mix | 3471 | 365 | 22370 | 2797 | 370 | 18410 |
| | $d_i \in [e, 10e]$ | 1229 | 115 | 22594 | 975 | 104 | 18310 |
| | d ← mix | 6057 | 375 | 22490 | 4996 | 371 | 18422 |

In an embodiment, the memory 102 can be configured to store any data that is associated with the scheduling of the set of non-preemptive tasks in the multi-robot environment. In an embodiment, the information pertaining to the plurality of tasks partitioned, scheduling of the set of schedulable tasks and the set of non-schedulable tasks, the deadline, and the performance loss etc. is stored in the memory 102. Further, all information (inputs, outputs and so on) pertaining to scheduling the set of non-preemptive tasks in the multi-robot environment may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims The embodiments of present disclosure herein addresses unresolved problem of scheduling the set of non-preemptive tasks in the multi-robot environment or scheduling the set non-preemptive tasks on the multi-processor system. The embodiment, thus provides for the scheduling technique to schedule the set of non-preemptive tasks in the multi-robot environment, wherein the scheduling technique provides for the partitioning of each of the set of non-preemptive tasks, and finally provides for the scheduling of each of the plurality of tasks (the set of non-preemptive tasks) partitioned upon determining the possibility of execution of each of the set of schedulable tasks and the possibility of scheduling the set of pre-assigned tasks amongst the plurality of robots. Moreover, the embodiments herein further provides minimization of the performance loss associated with each of the set of preemptive tasks and unlike the traditional systems and methods, each of the set of preemptive tasks, by implementing the scheduling technique, is scheduled to be executed in the multi-robot environment.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of scheduling a set of non-preemptive tasks in a multi-robot environment, the method comprising a processor implemented steps of:
    defining, by one or more hardware processors, a plurality of tasks, wherein each the plurality of tasks is a non-preemptive task characterized by an execution time, a specified time interval for completing the non-preemptive task and a performance loss function per time unit;
    partitioning, by a scheduling technique, the plurality of tasks into a set of schedulable tasks and a set of non-schedulable tasks, wherein the set of schedulable tasks comprise a subset of tasks to be executed within a predefined time interval and having a maximum performance loss value, and wherein the set of non-schedulable tasks comprise a subset of tasks failing to execute within the predefined time interval and with a low performance loss value; and
    scheduling, in a pre-defined order, the plurality of tasks partitioned by performing a plurality of steps wherein the plurality of steps comprise;
        (i) sorting, by the scheduling technique, the plurality of tasks partitioned in non-increasing order of one or more performance loss values corresponding to the plurality of tasks partitioned;
        (ii) scheduling the set of schedulable tasks in the multi-robot environment by assigning at least one of the set of schedulable tasks to each robot amongst a plurality of robots operating in the multi-robot environment by implementing a compaction mechanism, wherein the scheduling comprises:
            (a) determining, by the scheduling technique, a possibility of execution of each of the set of schedulable tasks in the multi-robot environment;
            (b) determining, by the scheduling technique, a possibility of scheduling a set of pre-assigned tasks amongst the plurality of robots, wherein the set of pre-assigned tasks comprise one or more tasks other than the set of schedulable tasks and the set of non-schedulable tasks; and
            (c) scheduling, by the compaction mechanism, the set of schedulable tasks in the multi-robot environment upon determining the possibility of execution of each of the set of schedulable tasks and the possibility of scheduling the set of pre-assigned tasks; and
        (iii) scheduling, by a list-scheduling technique, the set of non-schedulable tasks amongst the plurality of robots.

2. The method of claim 1, wherein the step of scheduling the set of schedulable tasks comprises categorizing, by the scheduling technique, one or more schedulable tasks amongst the set of schedulable tasks as a non-schedulable task upon determining either one of:
    (i) a least possibility of the execution of each of the schedulable task amongst the set of schedulable tasks; or
    (ii) a least possibility of scheduling the set of pre-assigned tasks.

3. The method of claim 1, wherein the step of scheduling the plurality of tasks partitioned comprises performing, based upon the one or more performance loss values corresponding to the plurality of tasks, a load balancing of the plurality of tasks partitioned, to optimize the scheduling of the set of non-preemptive tasks in the multi-robot environment.

4. The method of claim 3, wherein the load balancing comprises:
    (i) a re-arrangement of one or more schedulable tasks and one or more non-schedulable tasks based upon an identical performance loss value, wherein the one or more schedulable tasks and the one or more non-schedulable tasks correspond to the set of schedulable tasks and the set of non-schedulable tasks respectively; and
    (ii) an identification of the one or more non-schedulable tasks with a maximum priority value from the set of non-schedulable tasks by implementing the scheduling technique to schedule the set of non-preemptive tasks in the multi-robot environment.

5. The method of claim 4, wherein the identical performance loss value corresponds to each of the one or more schedulable tasks and the one or more non-schedulable tasks, and wherein the one or more schedulable tasks and the one or more non-schedulable tasks correspond to the set of schedulable tasks and the set of non-schedulable tasks respectively.

6. The method of claim 4, wherein the step of identification of the one or more non-schedulable tasks is performed iteratively by implementing the scheduling technique, until each the set of non-schedulable tasks is scheduled in the multi-robot environment.

7. A system for scheduling a set of non-preemptive tasks in a multi-robot environment, the system comprising:
   a memory storing instructions;
   one or more communication interfaces; and
   one or more hardware processors coupled to the memory via the one or more communication interfaces, wherein the one or more hardware processors are configured by the instructions to:
      define, a plurality of tasks, wherein each of the plurality of tasks is a non-preemptive task characterized by an execution time, a specified time interval for completing the non-preemptive task and a performance loss function per time unit;
      partition, by a scheduling technique, the plurality of tasks into a set of schedulable tasks and a set of non-schedulable tasks, wherein the set of schedulable tasks comprise a subset of tasks to be executed within a predefined time interval and having a maximum performance loss value, and wherein the set of non-schedulable tasks comprise a subset of tasks failing to execute within the predefined time interval and with a low performance loss value; and
      schedule, in a pre-defined order, the plurality of tasks partitioned by performing a plurality of steps, wherein the plurality of steps comprise:
         (i) sort, by the scheduling technique, the plurality of tasks partitioned in non-increasing order of one or more performance loss values corresponding to the plurality of tasks partitioned;
         (ii) schedule the set of schedulable tasks in the multi-robot environment by assigning at least one of the set of schedulable tasks to each robot amongst a plurality of robots operating in the multi-robot environment by implementing a compaction mechanism, wherein the scheduling comprises, wherein the scheduling comprises:
            (a) determine, by the scheduling technique, a possibility of execution of each of the set of schedulable tasks in the multi-robot environment;
            (b) determine, by the scheduling technique, a possibility of scheduling a set of pre-assigned tasks amongst the plurality of robots, wherein the set of pre-assigned tasks comprise one or more tasks other than the set of schedulable tasks and the set of non-schedulable tasks; and
            (c) schedule, by the compaction mechanism, the set of schedulable tasks upon determining the possibility of execution of each of the set of schedulable tasks and the possibility of scheduling the set of pre-assigned tasks amongst the plurality of robots; and
         (iii) schedule, by a list-scheduling technique, the set of non-schedulable tasks amongst the plurality of robots.

8. The system of claim 7, wherein the one or more hardware processors are configured to schedule the set of schedulable tasks by categorizing, via the scheduling technique, one or more schedulable tasks amongst the set of schedulable tasks as a non-schedulable task upon determining either one of:
   (i) a least possibility of the execution of each of the schedulable task amongst the set of schedulable tasks; or
   (ii) a least possibility of scheduling the set of pre-assigned tasks.

9. The system of claim 7, wherein the one or more hardware processors are configured to schedule the plurality of tasks partitioned by performing, based upon the one or more performance loss values corresponding to the plurality of tasks, a load balancing of the plurality of tasks partitioned, to optimize the scheduling of the set of non-preemptive tasks in the multi-robot environment.

10. The system of claim 9, wherein the load balancing comprises:
   (i) a re-arrangement of one or more schedulable tasks and one or more non-schedulable tasks based upon an identical performance loss value, wherein the one or more schedulable tasks and the one or more non-schedulable tasks correspond to the set of schedulable tasks and the set of non-schedulable tasks respectively; and
   (ii) an identification of the one or more non-schedulable tasks with a maximum priority value from the set of non-schedulable tasks by implementing the scheduling technique to schedule the set of non-preemptive tasks in the multi-robot environment.

11. The system of claim 10, wherein the identical performance loss value corresponds to each of the one or more schedulable tasks and the one or more non-schedulable tasks, and wherein the one or more schedulable tasks and the one or more non-schedulable tasks correspond to the set of schedulable tasks and the set of non-schedulable tasks respectively.

12. The system of claim 10, wherein the one or more hardware processors are configured to perform iteratively, by implementing the scheduling technique, the step of identification of the one or more non-schedulable tasks, until each of the set of non-schedulable tasks is scheduled in the multi-robot environment.

13. One or more non-transitory machine readable information storage mediums comprising one or more instructions which when executed by one or more hardware processors cause:
   defining, by the one or more hardware processors, a plurality of tasks, wherein each the plurality of tasks is a non-preemptive task characterized by an execution time, a specified time interval for completing the non-preemptive task and a performance loss function per time unit;
   partitioning, by a scheduling technique, the plurality of tasks into a set of schedulable tasks and a set of non-schedulable tasks, wherein the set of schedulable tasks comprise a subset of tasks to be executed within a predefined time interval and having a maximum performance loss value, and wherein the set of non-schedulable tasks comprise a subset of tasks failing to execute within the predefined time interval and with a low performance loss value; and
   scheduling, in a pre-defined order, the plurality of tasks partitioned by performing a plurality of steps, wherein the plurality of steps comprise:
      (i) sorting, by the scheduling technique, the plurality of tasks partitioned in non-increasing order of one or more performance loss values corresponding to the plurality of tasks partitioned;

(ii) scheduling the set of schedulable tasks in the multi-robot environment by assigning at least one of the set of schedulable tasks to each robot amongst a plurality of robots operating in the multi-robot environment by implementing a compaction mechanism, wherein the scheduling comprises:

(a) determining, by the scheduling technique, a possibility of execution of each of the set of schedulable tasks in the multi-robot environment determining, by the scheduling technique, a possibility of scheduling;

(b) a set of pre-assigned tasks amongst the plurality of robots, wherein the set of pre-assigned tasks comprise one or more tasks other than the set of schedulable tasks and the set of non-schedulable tasks; and (c) scheduling, by the compaction mechanism, the set of schedulable tasks in the multi-robot environment upon determining the possibility of execution of each of the set of schedulable tasks and the possibility of scheduling the set of pre-assigned tasks; and (iii) scheduling, by a list-scheduling technique, the set of non-schedulable tasks amongst the plurality of robots.

14. The one or more non-transitory machine readable information storage mediums of claim 13, wherein the step of scheduling the set of schedulable tasks comprises categorizing, by the scheduling technique, one or more schedulable tasks amongst the set of schedulable tasks as a non-schedulable task upon determining either one of:

(i) a least possibility of the execution of each of the schedulable task amongst the set of schedulable tasks; or (ii) a least possibility of scheduling the set of pre-assigned tasks.

15. The one or more non-transitory machine readable information storage mediums of claim 13, wherein the step of scheduling the plurality of tasks partitioned comprises performing, based upon the one or more performance loss values corresponding to the plurality of tasks, a load balancing of the plurality of tasks partitioned, to optimize the scheduling of the set of non-preemptive tasks in the multi-robot environment.

16. The one or more non-transitory machine readable information storage mediums of claim 15, wherein the load balancing comprises:

(i) a re-arrangement of one or more schedulable tasks and one or more non-schedulable tasks based upon an identical performance loss value, wherein the one or more schedulable tasks and the one or more non-schedulable tasks correspond to the set of schedulable tasks and the set of non-schedulable tasks respectively; and (ii) an identification of the one or more non-schedulable tasks with a maximum priority value from the set of non-schedulable tasks by implementing the scheduling technique to schedule the set of non-preemptive tasks in the multi-robot environment.

17. The one or more non-transitory machine readable information storage mediums of claim 16, wherein the identical performance loss value corresponds to each of the one or more schedulable tasks and the one or more non-schedulable tasks, and wherein the one or more schedulable tasks and the one or more non-schedulable tasks correspond to the set of schedulable tasks and the set of non-schedulable tasks respectively.

18. The one or more non-transitory machine readable information storage mediums of claim 16, wherein the step of identification of the one or more non-schedulable tasks is performed iteratively by implementing the scheduling technique, until each the set of non-schedulable tasks is scheduled in the multi-robot environment.

* * * * *